United States Patent [19]

D'Angelo et al.

[11] 3,924,497

[45] Dec. 9, 1975

[54] METHOD OF DISPENSING A MICROFOAM SHEET

[75] Inventors: Joseph D'Angelo, Wyckoff; Lawrence Maccherone, Ringwood, both of N.J.; Frank George Maros, Media, Pa.

[73] Assignee: E. I. Du Pont de Nemours and Company, Wilmington, Del.

[22] Filed: Feb. 19, 1975

[21] Appl. No.: 550,988

[52] U.S. Cl. .......................... 83/16; 83/24; 83/171; 83/261; 83/282; 83/373
[51] Int. Cl.² ............................................ B26F 3/12
[58] Field of Search ....... 83/373, 16, 171, 261, 358, 83/359, 282, 24

[56] References Cited
UNITED STATES PATENTS 2,272,215  2/1940  Lockett et al. ................... 83/358 X
3,207,018  9/1965  Rauenbuehler et al. .......... 83/261 X Primary Examiner—J. M. Meister

[57] ABSTRACT

A method of dispensing a microfoam sheet of predetermined length by cutting a web of microfoam by moving a hot wire through apertures between first and second plates of upper and lower members between which the web is moved. Nip rolls move the web a predetermined distance past the hot wire prior to cutting and the web is guided by having guiding surfaces on the plates of the lower member at an angle to the plates of the upper member, such angle extending outwardly in the direction of web travel. The lower member is pivoted into an operative position for cutting and web holding surfaces hold the web between the first plates as the hot wire is moved to cut the web. After cutting, the cut sheet is retained between clamping surfaces of the second plates by friction, ready for use.

5 Claims, 2 Drawing Figures

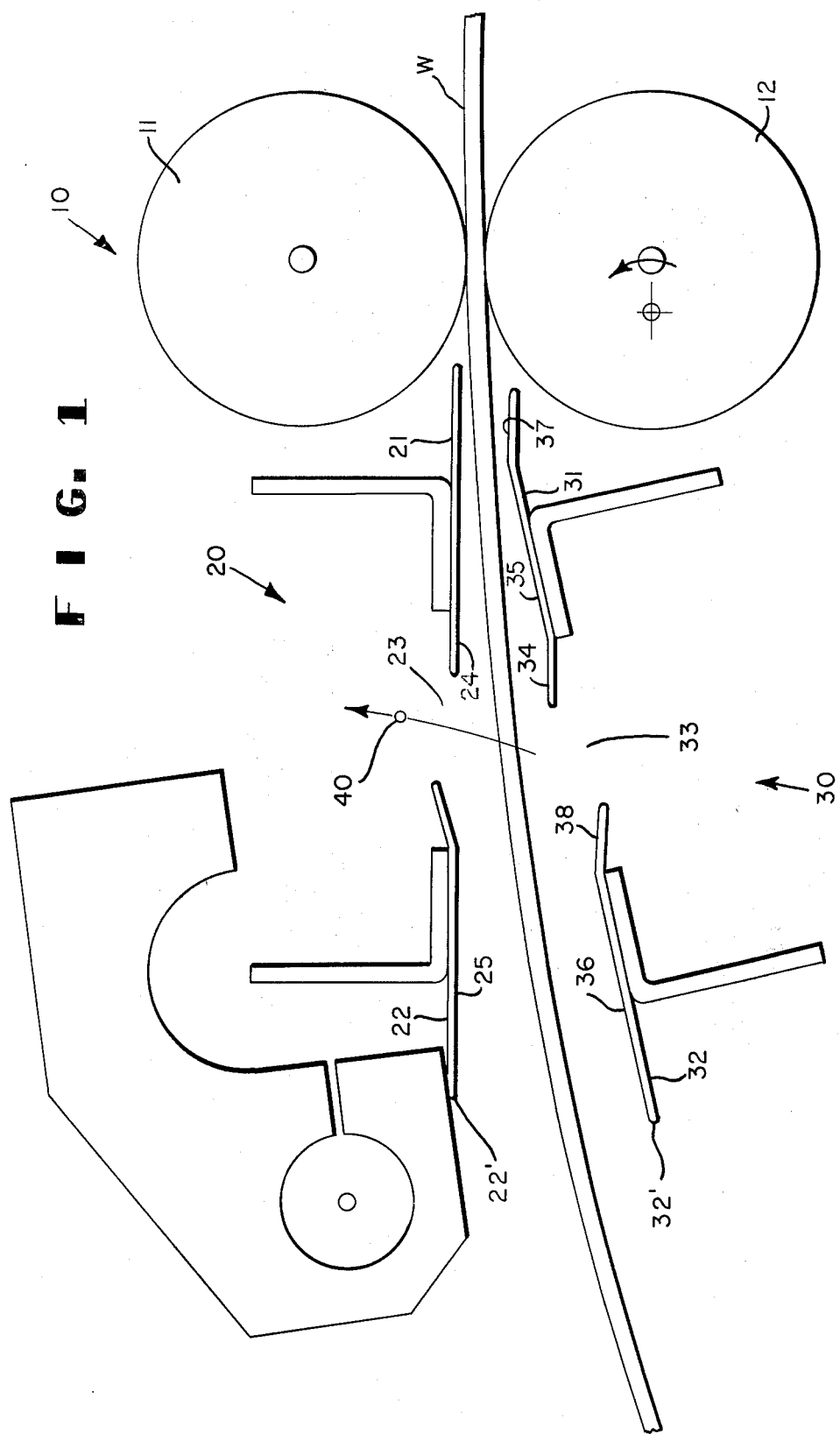

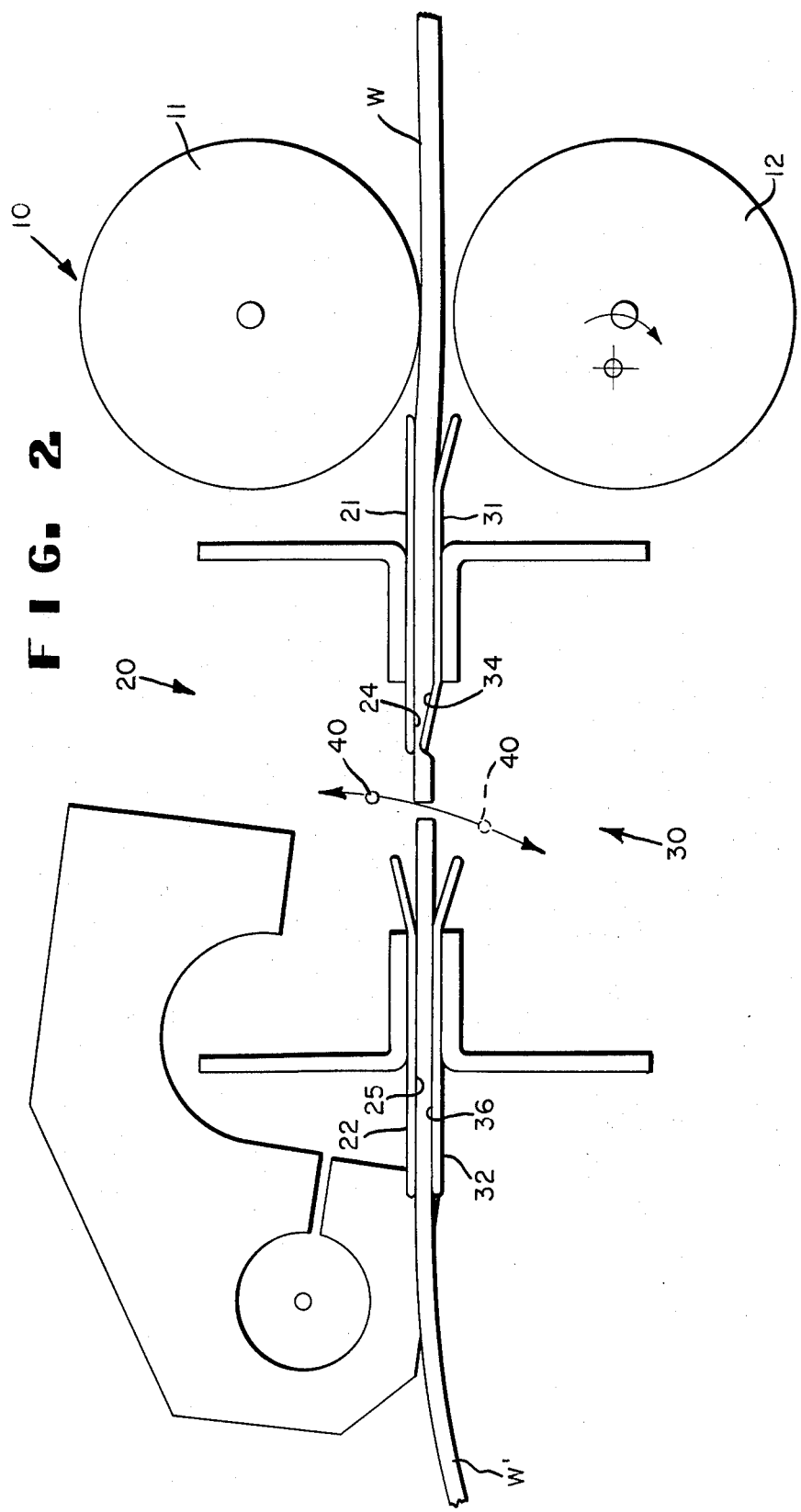

METHOD OF DISPENSING A MICROFOAM SHEET

BACKGROUND OF THE INVENTION

1. Field of the Invention

The field of art to which this invention pertains is dispensing and, specifically, to dispensing a sheet of predetermined length by cutting a web of microfoam using a hot wire. The web, of indeterminate length, is moved into position with respect to the hot wire by means of nip rolls. As it moves such web is guided between upper and lower members having surfaces disposed at proper angles to each other. After a predetermined length of the web has been so moved past the hot wire the lower member is pivoted into position whereby to hold the web for cutting and to retain the cut sheet, by friction, after cutting. This pivoting of the lower member simultaneously moves the nip rolls out of operative relationship with the web, thereby intermittently interrupting its movement during cutting.

2. Description of the Prior Art

Methods of dispensing are known to the prior art in which a web of material of indeterminate-length, such as plastic film, is cut using a hot wire in dispensing a sheet of predetermined length. For example, U.S. Pat. Nos. 2,726,706 to Ajkamaki and 3,441,460 to Carmichael show cutting a web of thermoplastic film by means of a hot wire or a hot tapered knife. After cutting is accomplished, each of these patents is further concerned with forming a seal at the cutting site.

Other patents teaching the cutting of thermoplastic film using a hot knife or hot wire include U.S. Pat. Nos. 3,524,783 to Sutherland; 2,947,127 to Herman and 3,009,851 to Madsen. Again, in addition to cutting, these patents are concerned with sealing after cutting.

A problem with the teachings of this art, and the other known art, is that it does not show a way to control a web of microfoam, a difficult material to handle, in an effective manner during movement and during cutting and particularly as such web moves in paths (the web of this invention may be moved and cut, under complete control, in either horizontal or vertical planes) where one would expect handling difficulties to occur.

SUMMARY OF THE INVENTION

Briefly summarized, this invention is a method of dispensing a microfoam sheet of predetermined size including the steps of:

a. positioning the leading edge of a web of microfoam in operative relationship with a web moving means in the form of nip rolls;

b. moving the web by means of the nip rolls between upper and lower members, c. moving the web a predetermined length past web cutting means with the leading edge extending at least beyond the outer edge of second plates of the upper and lower members;

d. moving the nip rolls out of operative relationship with the web, while simultaneously moving the lower member upwardly into position whereby to hold the web between holding surfaces of first plates of the upper and lower members and to clamp the web between clamping surfaces of the second plates of such upper and lower members;

e. cutting the web to form a microfoam sheet of predetermined size by moving the cutting means through apertures between the first and second plates of the upper and lower members, then returning such cutting means to its original inoperative position;

f. retaining, by friction, the cut sheet between the clamping surfaces of the second plates of the upper and lower members; and g. pulling the cut sheet from between these second plates of such upper and lower members.

In an important aspect of the invention, the upper and lower members have means defining surfaces disposed so as to guide the web between such members. After a predetermined length of the web is moved past the cutting means, preferably in the form of a hot wire, the lower member is pivoted into position whereby the web is effectively held for cutting, which pivoting interrupts the movement of the web by the nip rolls during cutting.

This invention gives to the art a method of dispensing a microfoam sheet of the desired size in position ready for immediate use. By being able to control the movement of the web in a desired path by means of the nip rolls and guiding surfaces of the upper and lower members between which the web is moved; i.e. in either a horizontal or vertical path depending on the use situation, and further by being able to continue this control during and after cutting, by means of the holding and clamping surfaces on upper and lower members, the art now has available to it, an effective way of dispensing not heretofore within its grasp.

BRIEF DESCRIPTION OF THE DRAWING

FIG. 1 is a schematic cross-sectional view of a dispensing device suitable for performing the method of this invention, showing a web of microfoam being moved between upper and lower members and into position for cutting.

FIG. 2 is a view similar to FIG. 1 showing the lower member after it has been pivoted into position to hold the web for cutting (which pivoting also intermittently interrupts the web movement) and in position to retain the cut sheet, after cutting.

DESCRIPTION OF THE PREFERRED EMBODIMENT

This invention is a method of dispensing a predetermined length of microfoam sheeting.

A better understanding of the specifics of such method may be had by considering the steps of method, as hereinafter explained in detail, in conjunction with the drawing.

Referring to such drawing, it will be seen that such method includes the steps of:

a. positioning a web W of microfoam in operative relationship with a web moving means 10 in the form of nip rolls 11 and 12;

b. moving the web W in a desired path, as designed by the arrow in FIG. 1, by means of the nip rolls and between upper and lower members generally designed 20 and 30, the upper member having means defining first and second plates 21 and 22 having an aperture 23 therebetween adapted to receive a web cutting means 40, the first plate 21 having means defining a web holding surface 24 and the second plate 22 having means defining a web clamping surface 25, the lower member 30 having means defining first and second plates 31 and 32 having an aperture 33 therebetween adapted to receive such web cutting means 40, the first plate 31 having means defining a web holding surface 34 and a web first guiding surface 35 and the second plate 32 having means defining a web clamping and first guiding surface 36, which first guiding surfaces 35 and 36 of the first and second plates 31 and 32 of the lower member 30 are disposed at an angle to the holding and clamping surfaces 24 and 25 of the first and second plates 21 and 22 of the upper member 20 as the web W is moved between the upper annd lower members 20 and 30, such angle extending outwardly in the direction of web travel, and the web cutting means 40 being positioned out of contact with the web W in an inoperative position as such web is moved between the upper and lower members 20 and 30;

c. moving the web W a predetermined length past the web cutting means 40 with the leading edge extending at least beyond the outer edges 22' and 32' of the second plates 22 and 32 of the upper and lower members 20 and 30;

d. moving the nip rolls 11 and 12 out of operative relationship with the web W, while simultaneously moving or pivoting the lower member 30 upwardly into an operative position, about the pivot as shown, whereby to hold the web W between the holding surfaces 24 and 34 of the first plates 21 and 31 of the upper and lower members 20 and 30;

e. cutting the web W as so held to form a microfoam sheet of predetermined length by moving the cutting means 40 through the apertures 23 and 33 between the first and second plates of the upper and lower members 20 and 30, then returning such cutting means 40 to its original inoperative position as shown by the arrows in FIG. 2;

f. retaining, by friction, the cut sheet W' between the clamping surfaces 25 and 36 of the second plates 22 and 32 of the upper and lower members 20 and 30; and g. pulling the cut sheet W' from between these second plates 25 and 36 of such upper and lower members.

As shown in FIGS. 1 and 2, the web is being moved and cut by the dispensing device in a horizontal plane. As will further be explained, such device may be turned on end and the web moved and cut in a vertical plane, which has been found highly to be desired in certain instances.

In moving the web W for cutting in a horizontal plane, the web first guiding surfaces 35 and 36 of the first and second plates 31 and 32 of the lower member 30 are disposed downwardly at an angle to the horizontal in the direction of web travel and thus disposed act to guide the leading edge of the web W between the upper and lower member 20 and 30 without it falling into the aperture 33 between the first and second plates 31 and 32 of the lower member, due to the tendency of such leading edge to flex downwardly from the horizontal due to the structure of the web and gravity, as the web is moved between the upper and lower members 20 and 30. These same first guiding surfaces 35 and 36 of the first and second plates 31 and 32 also act, particularly in concert with the nip rolls 11 and 12, to guide the web W between the upper and lower members 20 and 30, when moving the web at other angles with respect to the horizontal.

The first plate 31 of the lower member 30 further may be provided with means defining a web stripping and second guiding surface 37 and the web holding surface 34 also may function as a web second guiding surface. Further, the second plate 32 of the lower member 30 may be provided with means defining a web second guiding surface 38. When moving the web for cutting in a horizontal plane, these second guiding surfaces 34 and 37 of the first plate 31 of the lower member 30, together with the second guiding surface 38 of the second plate 32 of the lower member 30 are horizontally disposed and act, with the downwardly disposed web first guiding surfaces 35 and 36 of the first and second plates 31 and 32 of the lower member 30 to guide the leading edge of the web through the upper and lower members 20 and 30, as the web is moved between such members. And, of course, these same second guiding surfaces 34, 37 and 38 will further function to help guide the web, as moved and cut other than in a horizontal plane.

During cutting, as shown in FIG. 2, the web holding surface 34 of the first plate 31 of the lower member is upwardly disposed in the direction of web travel and pushes into the web to hold such web W securely for cutting between the holding surface 24 and 34 of first plates 21 and 31 of the upper and lower members 20 and 30. It should be noted that this holding surface 34 of such first plate 31, when acting as a second guide surface, combines with the first guiding surface 35 of that plate 31 and with the first and second guiding surfaces 38 and 36 of the second plate 32 to effectively guide the web over these surfaces, from the first plate 31, over the aperture 33, and onto the second plate 32. This task, of course, is most difficult when the web is being moved in a horizontal plane; with the plates positioned as shown, this movement presents no problems.

It is important that the web be held securely for cutting particularly since the cutting means 40, preferably in the form of a hot wire supported at its ends, is moved against and through the web with appropriate speed to cut it form the sheet as desired. This relative motion between the web and the wire, which is heated to the required temperature depending upon the web thickness, places substantial forces on the web, particularly adjacent the cutting site and requires that the web be held and clamped firmly in a manner of the type as shown, and particularly between both the first and second plates of the upper and lower members adjacent the aperatures, to function properly.

The ability to use nip rolls, which are spaced apart a distance substantially equal to the thickness of the web, to move a delicate material, such as microfoam sheeting, is somewhat unexpected, as is the control capability of the rolls, in combination with the cooperating guiding surface structure of the plates of the dispensing device, in moving the web particularly in other than a horizontal plane. Further, it is merely a routine design matter to adapt these rolls to move a predetermined length of the web past a cutting means, using known timing devices or the like, which further enhances the practicality of the instant method.

Lastly, in practicing this method, it is particularly important to again stress that the web W may be moved in a horizontal plane or path or, if desired, at right or other angles to the horizontal and still be guided through the upper and lower members 20 and 30 with no problems and then cut in either position with ease and with complete control over the web.

This capability serves a known need, in the packaging of large items, such as a piece of furniture, for example, wherein the cut microfoam sheet is wrapped around the furniture to protect it. In this instance, it is often desirable to have such cut sheet in a vertical position where it may be immediately wrapped about the item. By following the method of this invention, this may be accomplished, since the web is always under complete control, no matter what its position, during movement and cutting.

As previously mentioned, this unexpected ability to control the web is brought about during web movement by the nip rolls in concert with the guiding and other surface structure of the plates of the upper and lower members and is brought about during, and after, the cutting step by the holding and clamping surfaces of such plates, as positioned during these important stages of the method.

We claim:

1. A method of dispensing a microfoam sheet of predetermined size including the steps of:
   a. positioning the leading edge of a web of microfoam in operative relationship with a web moving means in the form of nip rolls;
   b. moving the web by means of the nip rolls between upper and lower members,
      the upper member having means defining first and second plates having an aperture therebetween adapted to receive a web cutting means, the first plate having means defining a web holding surface and the second plate having means defining a web clamping surface,
      the lower member having means defining first and second plates having an aperture therebetween adapted to receive such web cutting means, the first plate having means defining a web holding surface and a web first guiding surface and the second plate having means defining a web clamping and first guiding surface, which first guiding surfaces of the first and second plates of the lower member are disposed at an angle to the holding and clamping surfaces of the first and second plates of the upper member as the web is moved between the upper and lower members, such angle extending outwardly in the direction of web travel, and
      the web cutting means being positioned out of contact with the web in an inoperative position as such web is moved between the upper and lower members;
   c. moving the web a predetermined length past the web cutting means with the leading edge extending at least beyond the outer edge of the second plates of the upper and lower members;
   d. moving the nip rolls out of operative relationship with the web, while simultaneously pivoting the lower member upwardly into an operative position whereby to hold the web between the holding surfaces of the first plates of the upper and lower members and to clamp the web between the clamping surfaces of the second plates of such upper and lower members;
   e. cutting the web to form a microfoam sheet of predetermined size by moving the cutting means through the apertures between the plates of the upper and lower members, then returning such cutting means to its original inoperative position;
   f. retaining, by friction, the cut sheet between the clamping surfaces of the second plates of the upper and lower members; and
   g. pulling the cut sheet from between these second plates of such upper and lower members.

2. The method of claim 1 wherein
   the web first guiding surfaces of the first and second plates of the lower member are disposed downwardly in the direction of web travel and thus disposed act to guide the leading edge of the web between the upper and lower members without it falling into the aperture between the first and second plates of the lower member, due to the tendency of such leading edge to flex downwardly from the horizontal due to the structure of the web and gravity, as the web is moved between the upper and lower members.

3. In the method of claim 2
   the first plate of the lower member further having means defining a web stripping and second guiding surface and the web holding surface thereof also being a web second guiding surface,
   the second plate of the lower member further having means defining a web second guiding surface,
   wherein such second guiding surfaces of the first plate of the lower member and such second guiding surface of the second plate of the lower member are horizontally disposed and act, with the downwardly disposed first guiding surfaces of the first and second plates of the lower member to guide the leading edge of the web between the upper and lower members as the web is moved between such members.

4. The method of claim 3 wherein
   the web holding surface of the first plate of the lower member is upwardly disposed in the direction of web travel and pushes into the web to hold the web securely for cutting between the holding surfaces of the first plates of the upper and lower members during cutting.

5. The method of claim 4 wherein
   the web cutting means is a hot wire.

* * * * *